United States Patent
Lin et al.

(10) Patent No.: US 11,262,832 B2
(45) Date of Patent: Mar. 1, 2022

(54) POWER CONSUMPTION CONTROL OF COMPUTING DEVICES

(71) Applicant: HEWLETT-PACKARD DEVELOPMENT COMPANY, L.P., Spring, TX (US)

(72) Inventors: Te-Yueh Lin, Taipei (TW); Shan-Jung Wu, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/964,376

(22) PCT Filed: Mar. 19, 2018

(86) PCT No.: PCT/US2018/023139
§ 371 (c)(1),
(2) Date: Jul. 23, 2020

(87) PCT Pub. No.: WO2019/182556
PCT Pub. Date: Sep. 26, 2019

(65) Prior Publication Data
US 2021/0048870 A1    Feb. 18, 2021

(51) Int. Cl.
*G06F 1/32*     (2019.01)
*G06F 1/3212*   (2019.01)

(52) U.S. Cl.
CPC .................. *G06F 1/3212* (2013.01)

(58) Field of Classification Search
CPC ..... G06F 1/32; G06F 1/28; G06F 1/26; G06F 1/12; G06F 9/44
See application file for complete search history.

(56) References Cited

U.S. PATENT DOCUMENTS

| | | |
|---|---|---|
| 8,203,314 B2 | 6/2012 | Odaohhara |
| 2002/0015316 A1* | 2/2002 | Nakazawa ........ H02M 3/33523 363/20 |
| 2003/0188206 A1 | 10/2003 | Odaohhara |
| 2004/0001526 A1 | 1/2004 | Hoffer |
| 2006/0152454 A1 | 7/2006 | Cok |
| 2013/0187446 A1* | 7/2013 | Ferrel ..................... B60L 50/16 307/9.1 |
| 2013/0222959 A1 | 8/2013 | Sawyers |
| 2014/0253047 A1* | 9/2014 | Horie .................... H02J 7/0068 320/150 |
| 2015/0346792 A1* | 12/2015 | Rathi ...................... G05F 1/625 713/310 |
| 2016/0099608 A1* | 4/2016 | Jao ........................... H02J 9/06 307/19 |
| 2017/0294793 A1 | 10/2017 | Yoon et al. |

FOREIGN PATENT DOCUMENTS

| | | |
|---|---|---|
| CN | 100375943 | 3/2008 |
| JP | 2007295681 | 11/2007 |
| JP | 5288446 | 9/2013 |

* cited by examiner

*Primary Examiner* — Keshab R Pandey
(74) *Attorney, Agent, or Firm* — HPI Patent Department

(57) ABSTRACT

In an example, power consumption of a computing device can be controlled based on a change in surface temperature of a power adapter supplying charging current to the computing device.

15 Claims, 5 Drawing Sheets

MEMORY 301

DEPENDENCE MODEL 312

| AVERAGE CHARGING CURRENT | LENGTH OF TIME PERIOD | ESTIMATED INCREASE OF SURFACE TEMPERATURE (IN DEGREE C) |
|---|---|---|
| 0.5 A | 5 MINUTES | 2 |
| 0.5 A | 10 MINUTES | 4 |
| 0.5 A | 15 MINUTES | 6 |
| 0.75 A | 5 MINUTES | 3 |
| 0.75 A | 10 MINUTES | 6 |
| 0.75 A | 15 MINUTES | 9 |
| 1 A | 5 MINUTES | 4 |
| 1 A | 10 MINUTES | 8 |
| 1 A | 15 MINUTES | 12 |

POWER CONSUMPTION CONTROL OF COMPUTING DEVICES

BACKGROUND

A computing device consumes electric power for its operation. The electric power may be received from a power adapter. The power adapter may receive input electric power from an electric supply, such as Alternating Current (AC) supply, and can provide output electric power, such as in the form of Direct Current (DC) power, to the computing device.

BRIEF DESCRIPTION OF DRAWINGS

The following detailed description references the figures, wherein:

FIG. 4 illustrates a dependence model, according to an example.

DETAILED DESCRIPTION

Figure 1:
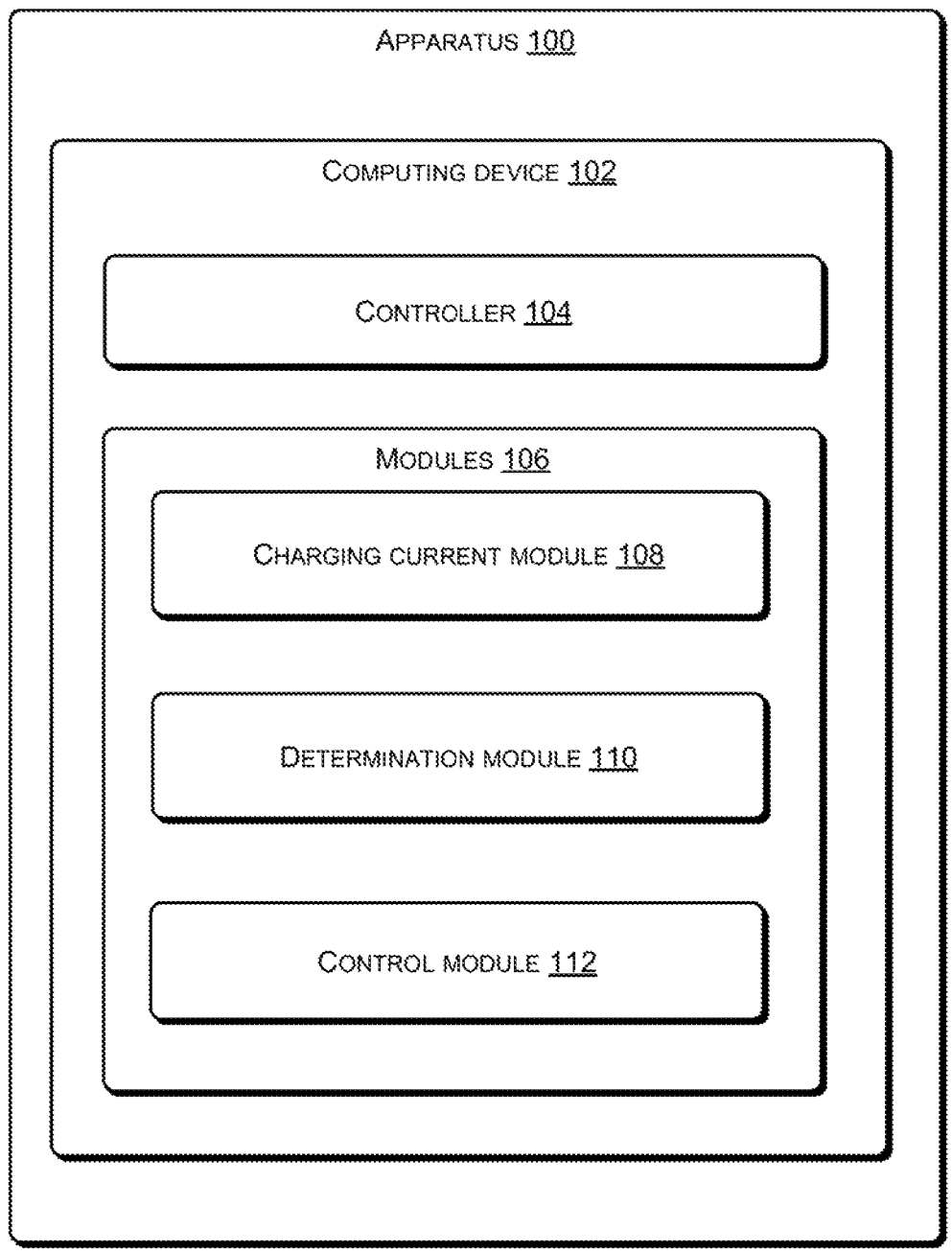
FIG. 1 illustrates an apparatus to control power consumption of a computing device, according to an example.

A computing device may receive electric power for its operation from a power adapter. A surface temperature of the power adapter may vary based on an amount of the electric power supplied by the power adapter to the computing device. For instance, when the computing device is running several resource-intensive applications simultaneously, the computing device may draw a large amount of power from the power adapter. The supply of a large amount of electric power for an extended period of time may increase the surface temperature of the power adapter. As will be understood, the surface temperature of the power adapter may refer to the temperature of an outer housing of the power adapter.

A high surface temperature of the power adapter indicates that components of the power adapter, such as transformer, rectifier, and the like, are operating at a high temperature. The high temperature may affect the operation of the components, and the overall functioning of the power adapter. Further, the high surface temperature may also cause burns to a user who may come in contact with the power adapter.

The present subject matter relates to controlling power consumption of computing devices. With the implementations of the present subject matter, increase in surface temperature of power adapters supplying power to the computing devices can be controlled.

In accordance with an example implementation, a computing device that receives charging current from a power adapter can determine if a change in surface temperature of the power adapter over a time period is beyond a threshold. The determination can be performed based on an average of the charging current over the time period and a length of the time period. Based on the determination, the computing device can control its power consumption. For example, if the computing device determines that an increase in the surface temperature of the power adapter is beyond the threshold, the computing device can decrease its power consumption.

In an example implementation, to perform the determination, the computing device can estimate the change in surface temperature based on the average of the charging current and the length of the time period. For the estimation, the computing device can utilize a dependence model indicating dependence of the change in surface temperature on the average of the charging current and the length of the time period.

Using example implementations of the present subject matter, change in surface temperature of a power adapter can controlled. Since the determination of whether a change in the surface temperature is beyond a threshold is performed based on the charging current and the length of the time period, a temperature sensor is not to be used in the power adapter for measuring the surface temperature. Thus, the present subject matter is simple to implement. Further, no modifications are to be performed to the existing design of the power adapters, for example, to fit temperature sensors or other additional components.

The following description refers to the accompanying drawings. Wherever possible, the same reference numbers are used in the drawings and the following description to refer to the same or similar parts. While several examples are described in the description, modifications, adaptations, and other implementations are possible and are intended to be covered herein.

FIG. 1 illustrates an apparatus 100 to control power consumption of a computing device 102, according to an example. The computing device 102 can be, for example, a laptop computer, a smartphone, a tablet device, a Personal Digital Assistant (PDA), or the like. The computing device 102 includes a controller 104 and a plurality of modules 106, collectively referred to as modules 106. The computing device 102 may receive charging current from a power adapter (not shown in FIG. 1) to, for example, charge a battery (not shown in FIG. 1) of the computing device 102 and to power other components, such as the controller 104, of the computing device 102.

The controller 104 may be, for example, an embedded controller (EC) of the computing device 102. In another example, the controller 104 may be a processor of the computing device 102. The processor may be implemented as microprocessors, microcomputers, microcontrollers, digital signal processors, central processing units, state machines, logic circuitries, and/or any devices that manipulate signals based on operational instructions. Among other capabilities, the processor may fetch and execute computer-readable instructions stored in a memory. The functions of the processor may be provided using dedicated hardware as well as hardware capable of executing machine-readable instructions.

The modules 106 include a charging current module 108, a determination module 110, and a control module 112. Each module of the modules 106 may be coupled to and/or be executable by the controller 104, and may include, amongst other things, routines, programs, objects, components, data structures, and the like, which perform particular tasks or implement particular abstract data types.

In operation, the charging current module 108 can compute an average of the charging current received over a time period. The average of the charging current will be hereinafter referred to as average charging current.

The supply of the charging current over the time period by the power adapter may cause a change in a surface temperature of the power adapter. For example, if the computing device 102 is running several resource-intensive applications over the time period, it may draw a large amount of charging current from the power adapter, which may cause increase in surface temperature of the power adapter. The surface temperature of the power adapter may refer to a temperature of an outer housing of the power adapter. The determination module 110 can determine if the change in surface temperature of the power adapter over the time period is beyond a threshold. The determination as to whether the change in surface temperature of the power adapter is beyond a threshold will be hereinafter referred to as the determination. The determination module 110 can perform the determination based on the average charging current and a length of the time period. The determination would be explained in greater detail with reference to the subsequent figures.

Based on the determination, the control module 112 can control power consumption of the computing device 102. For example, if the determination module 110 determines that the surface temperature would increase beyond the threshold, the control module 112 may decrease the power consumption of the computing device 102. The decrease in power consumption may be effected by reducing speed of the processor of the computing device 102, as will be explained later.

Figure 2:
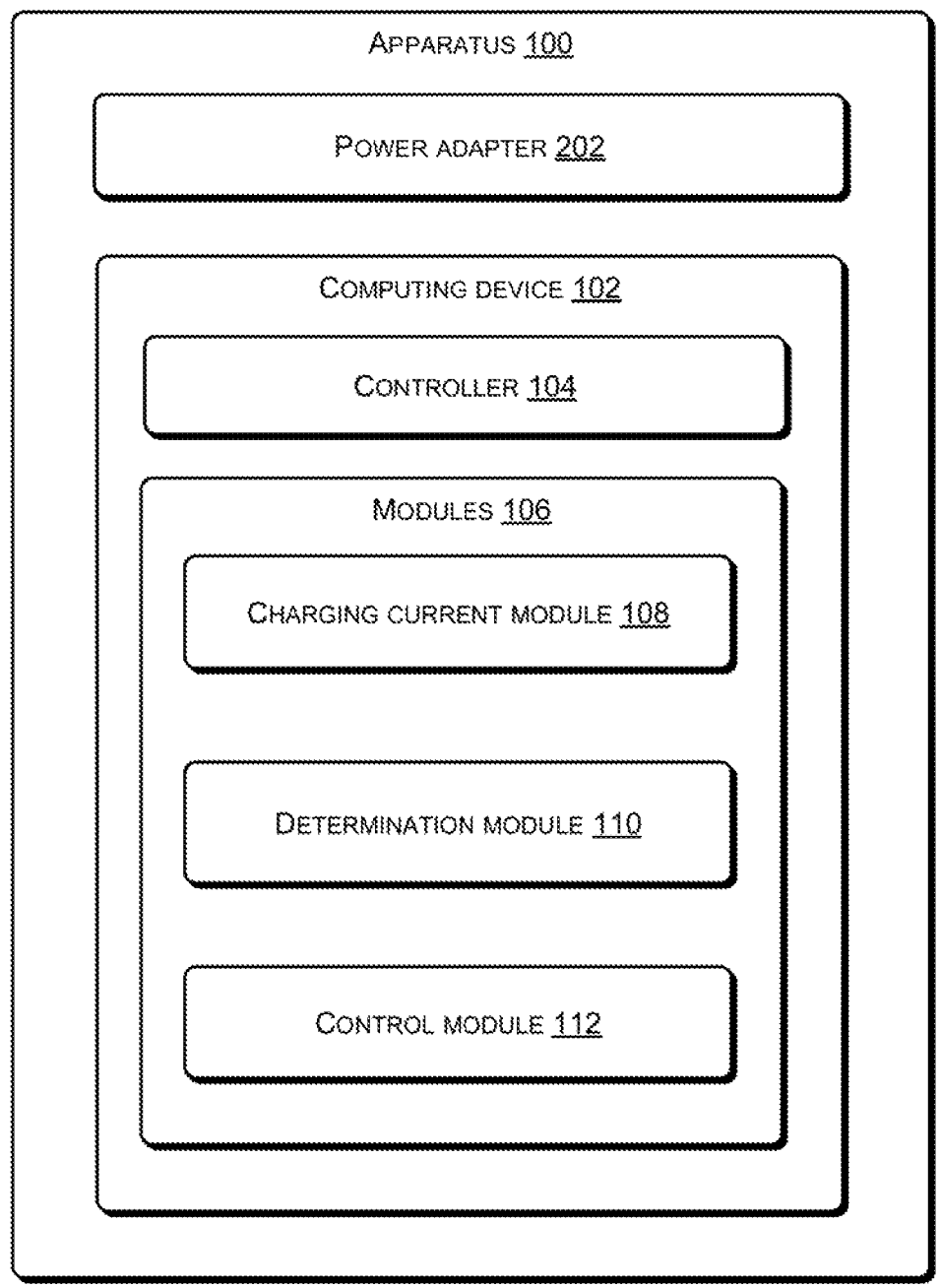
FIG. 2 illustrates an apparatus including a power adapter and a computing device to control power consumption of the computing device, according to an example.

FIG. 2 illustrates the apparatus 100 including a power adapter 202 and the computing device 102 to control power consumption of the computing device 102, according to an example. The power adapter 202 may supply charging current to the computing device 102 to power the computing device 102. As explained earlier, the computing device 102 includes the controller 104, the charging current module 108, the determination module 110, and the control module 112.

In an example, the charging current module 108 monitors charging current received by the computing device 102 from the power adapter 202. As mentioned earlier, the supply of the charging current may increase the surface temperature of the power adapter 202. The determination module 110 determines if the increase in the surface temperature over a time period is beyond a threshold based on an average charging current over the time period and a length of the time period. For example the determination module 110 may determine that an average charging current of 1 A for ten minutes would cause an increase in surface temperature beyond the threshold at the end of ten minutes.

If the determination module 110 determines that the increase in surface temperature is beyond the threshold, the control module 112 can decrease power consumption of the computing device 102.

The operations of the charging current module 108, the determination module 110, and the control module 112 will be explained with reference to FIG. 3.

Figure 3:
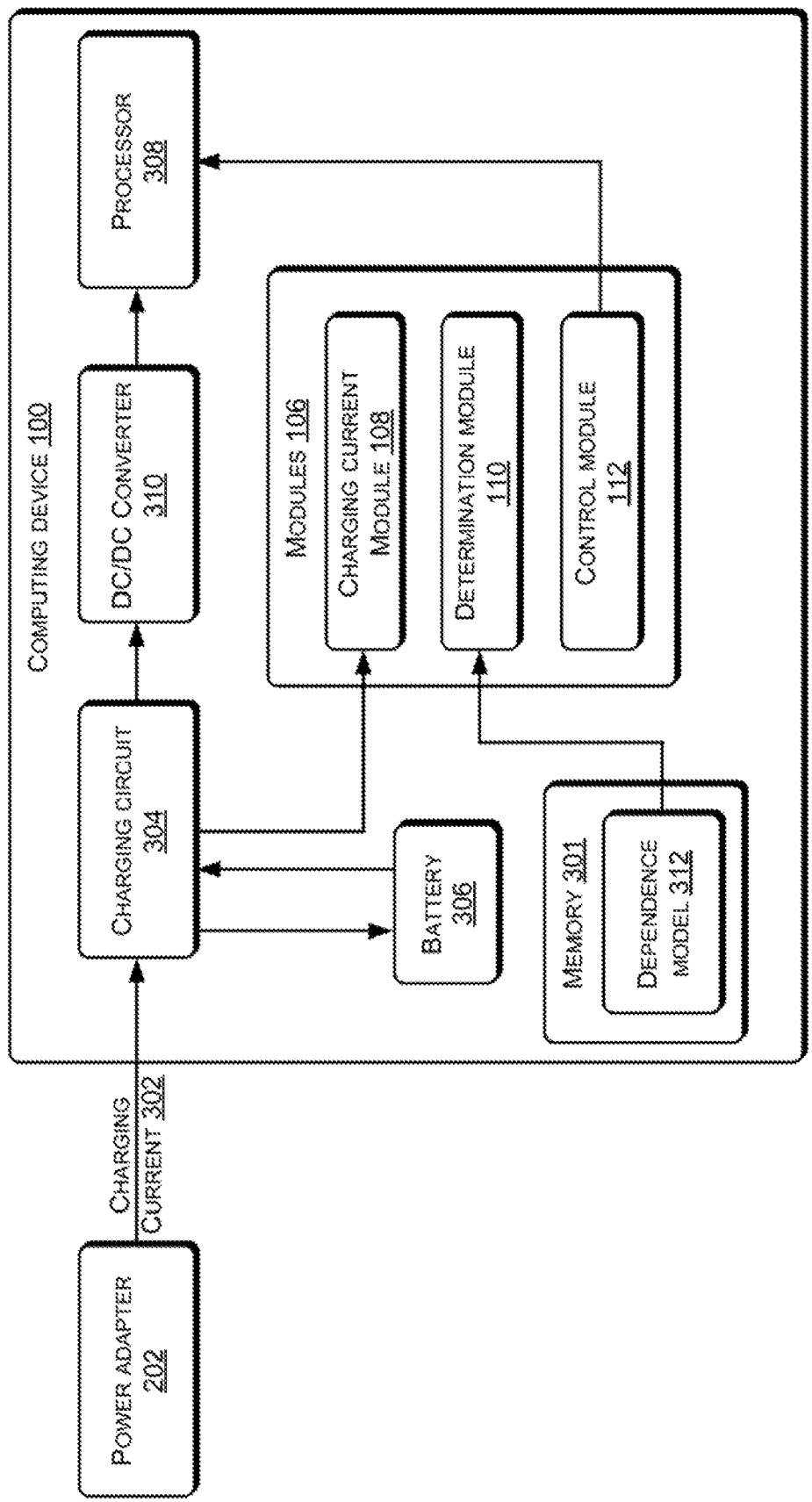
FIG. 3 illustrates interaction of modules of a computing device with other components of the computing device to control power consumption of the computing device, according to an example.

FIG. 3 illustrates interaction of the modules 106 with other components of the computing device 102 to control power consumption of the computing device, according to an example.

In addition to the modules 106, the computing device 102 may also include memory 301, interface(s), and system data (interface(s) and system data not shown in FIG. 3). The memory 301 may include any non-transitory computer-readable medium including, for example, volatile memory (e.g., RAM), and/or non-volatile memory (e.g., EPROM, flash memory, Memristor, etc.). The memory 301 may also be an external memory unit, such as a flash drive, a compact disk drive, an external hard disk drive, or the like. When the controller 104 is an EC, the memory 301 may be the memory associated with the EC.

The interface(s) may include a variety of machine readable instructions-based interfaces and hardware interfaces that allow interaction with a user and with other communication and computing devices, such as network entities, web servers, and external repositories, and peripheral devices.

The system data may serve as a repository for storing data that may be fetched, processed, received, or created by the modules 106.

In operation, the computing device 102 receives charging current 302 from the power adapter 202. The charging current 302 may be a DC current. The charging current 302 may be received by a charging circuit 304, which regulates charging of a battery 306 of the computing device 102. For example, the charging circuit 304 can stop charging of the battery 306 when the battery 306 is fully charged. The charging circuit 304 can also control discharge of the battery 306 for powering various components of the computing device 102. The computing device 102 also includes a processor 308. Although the processor 308 is shown to be different from the controller 104, in an example, the processor 308 may be same as the controller 104. Accordingly, the processor 308 may execute the modules 106.

The computing device 102 further includes a DC/DC converter 310 that converts DC power received from the charging circuit 304 into a suitable form for powering components, such as the processor 308, of computing device 102. The conversion may be such that the DC power supplied to the components is free of any voltage fluctuations and that the supplied power does not vary due to differences in ratings of the power adapter 202 or the battery 306.

The supplying of the charging current 302 may cause an increase in the surface temperature of the power adapter 202. For example, if the power adapter 202 supplies a high charging current for a prolonged period of time, the components of the power adapter 202, such as transformer and diode (neither shown in FIG. 3), may get heated. This heat may get transferred to the outer housing of the power adapter 202, causing increase in the surface temperature.

The present subject matter achieves a control of the increase in the surface temperature. For this, first, the charging current module 108 monitors the charging current 302 received by the charging circuit 304. The monitoring may be performed, for example, for a time period, such as ten minutes. Based on the monitoring, the charging current module 108 can compute an average charging current for the time period. The charging current module 108 can then provide the average charging current and a length of the time period to the determination module 110. Further, the charging current module 108 may resume monitoring the charging current 302 for the next time period. In this manner, the charging current module 108 computes the average charging current for each time period. In an example, the charging current module 108 can compute the average charging current for time periods of multiple lengths. For example, the charging current module 108 can compute the average charging current for each five-minute period and for each ten-minute period (including two five-minute periods).

Using the average charging current and the length of the time period, the determination module 110 can determine if an increase in the surface temperature of power adapter 202 would increase beyond a threshold. The threshold may be pre-configured or may be configured from time to time, for example, by a user of the computing device 102. In an example, instead of using the absolute value of the average charging current, the determination module 110 can use a percentage value of the average charging current relative to a maximum value of the charging current. For instance, the determination module 110 can determine that the increase in surface temperature is beyond the threshold if the average charging current is more than 80% of a maximum charging current over a ten-minute time period.

To perform the determination, the determination module 110 utilizes a dependence model 312, which indicates dependence of the increase in surface temperature on the average charging current and the length of the time period. The dependence model 312 may be stored in the memory 301 and will be explained with reference to FIG. 4. In cases where the charging current module 108 computes average charging current for time periods of multiple lengths, the determination module 110 can perform the determination for time period of each length. For example, the determination module 110 can perform the determination for each five-minute period and each ten-minute period.

In an example, using the dependence model 312, the determination module 110 can estimate an increase in the surface temperature over the time, period. The determination module 110 can then compare the estimated increase in surface temperature with a threshold value to perform the determination.

If the determination module 110 determines that the increase in surface temperature is beyond the threshold, the control module 112 can decrease the power consumption of the computing device 102. To decrease the power consumption, in an example, the control module 112 can decrease speed of the processor 308. The decrease in speed of the processor 308 is commonly referred to as throttling of the processor 308. The control module 112 can decrease the power consumption intermittently, so that a marked difference in the performance of the computing device 102 is not perceived.

In an example, the control module 112 can maintain the power consumption at a decreased level or continue to decrease the power consumption until the average charging current decreases such that an increase in surface temperature corresponding to the average charging current is less than the threshold. For instance, if the increase in surface temperature over a first time period is beyond the threshold, the control module 112 can throttle the processor 308 during the subsequent time period, i.e. a second time period. For example, if the processor 308 was operating at a speed of 2.0 GHz during the first time period, the control module 112 can make the processor operate at 1.8 GHz, i.e., at 90% of original speed, in the second time period. Consequently, the average charging current over the second time period may decrease. If the determination module 110 determines that, for the average charging current over the second time period, the estimated increase in surface temperature is less than the threshold, the control module 112 can stop throttling the processor 308 in the third time period, and can allow the power consumption to increase. Otherwise, the control module 112 can operate the processor 308 at the reduced speed in the third time period as well.

From the above, can be understood that control of power consumption includes both decreasing power consumption when the surface temperature is determined to increase beyond a threshold and also increasing; the power consumption after a period of decreased power consumption.

FIG. 4 illustrates the dependence model 312, according to an example. As mentioned earlier, the dependence model 312 indicates dependence of the increase in surface temperature on the average charging current and the length of time period.

The dependence model 312 may include a table 402 to indicate the dependence of increase in surface temperature on average charging current and length of time period. Although the table 402 is explained with reference to three different values of average charging current (0.5 A, 0.75 A, and 1 A) and three different lengths of time period (5 minutes, 10 minutes, and 15 minutes), it is to be understood that the table 402 may include any number of such values.

The table 402 indicates estimated increase in surface temperature for several values of average charging current and for several values of length of time period. For example, as illustrated in FIG. 4, for an average charging current of 0.5 A for a time period of five minutes, the estimated increase in surface temperature is 2° C. The table 402 may be developed at the time of manufacturing of the power adapter 202. For instance, at the time of manufacturing, the actual increase in surface temperature of the power adapter for several values of average charging current and several lengths of time period may be monitored. The result of the monitoring may then be tabulated and stored in the form of the table 402 in the memory 301 of the computing device 102. Thus, during operation of the power adapter 202, upon receiving the average charging current and the length of time period from the charging current module 108, the determination module 110 can refer to the table 402 to determine the estimated increase in surface temperature. The estimated increase in surface temperature can then be compared with the threshold to perform the determination.

As mentioned earlier, in an example, the determination module 110 can utilize percentage of the average charging current relative to a maximum charging current. In such cases, instead of absolute values of average charging current, the table 402 may include percentage values.

It may be understood that the determination module 110 can perform the determination for a length of time period available in the table 402. For example, in the example illustrated in table 402, the determination can be performed for a five-minute period, ten-minute period, and a fifteen-minute period. Accordingly, the charging current module 108 can be configured to compute average charging current for the lengths of time period available in the table 402.

As explained earlier, based on the determination, the control module 112 can decrease the power consumption of the computing device 102, for example, by throttling the processor 308. Further, as explained earlier, the control module 112 can increase the power consumption after a time period of decreased power consumption, provided the increase in surface temperature over the time period has been determined to be less than the threshold.

In an example, instead of having the values of estimated increase in surface temperature, for each set of average charging current and length of time period, the table 402 may simply have an indication of whether the increase in surface temperature is beyond a threshold or not. For instance, the table 402 may indicate that, for an average charging current of 0.5 A for a time period of ten minutes, the increase in surface temperature is not beyond the threshold, while for an average charging current of 0.75 A for a time period of ten minutes, the crease in surface temperature is beyond the threshold. For this, during the development of the table 402, the threshold may be determined, and, for each set of average charging current and length of time period, the estimated increase in surface temperature may be compared against the threshold. The result of the comparison alone may then be stored in the table 402, instead of the estimated increase in surface temperature.

Although the dependence model 312 has been explained with reference to a table, the dependence model 312 may be implemented in other manners as well. For example, the dependence model 312 may include a mathematical function indicating the increase in surface temperature as a function of the average charging current and the length of time period.

Figure 5:
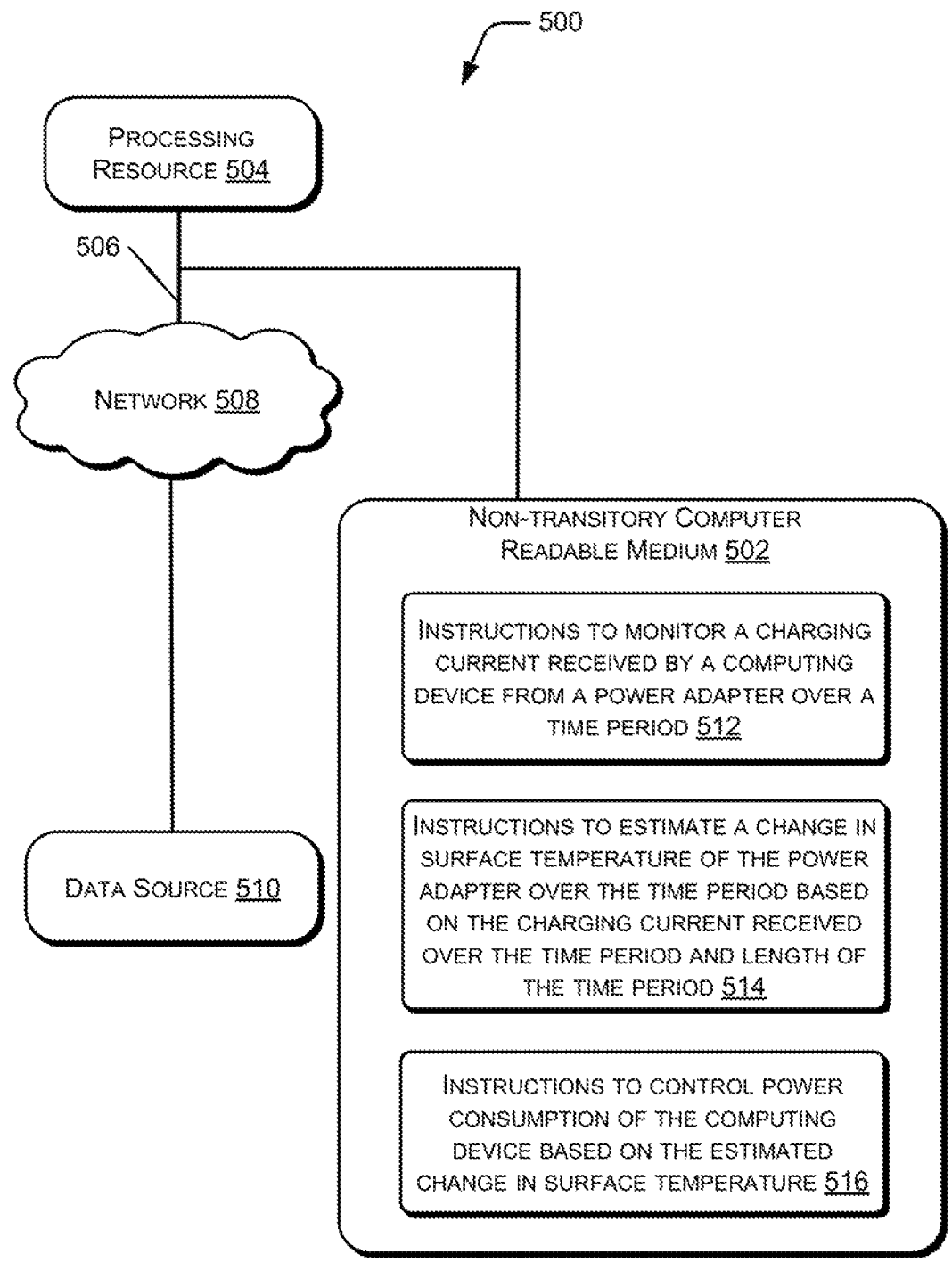
FIG. 5 illustrates a computing environment implementing a non-transitory computer-readable medium for controlling power consumption of computing devices, according to an example.

FIG. 5 illustrates a computing environment 500, implementing a non-transitory computer-readable medium 502 for controlling power consumption of computing devices, according to an example.

In an implementation, the non-transitory computer-readable medium 502 may be utilized by a computing device, such as the computing device 102. The computing device 102 may be implemented in a public networking environment or a private networking environment. In an implementation, the computing environment 500 may include a processing resource 504 communicatively coupled to the non-transitory computer-readable medium 502 through a communication link 506.

In an example, the processing resource 504 may be implemented in a computing device, such as the computing device. The processing resource 504 may be the controller 104, which, as mentioned earlier, may be the EC or the processor 308. The non-transitory computer-readable medium 502 may be, for example, an internal memory device or an external memory device. In one implementation, the communication link 506 may be a direct communication link, such as any memory read/write interface. In another implementation, the communication link 506 may be an indirect communication link, such as a network interface. In such a case, the processing resource 504 may access the non-transitory computer-readable medium 502 through a network 508. The network 508 may be a single network or a combination of multiple networks and may use a variety of different communication protocols.

The processing resource 504 and the non-transitory computer-readable medium 502 may also be communicatively coupled to data source 510 over the network 508.

In an example implementation, the non-transitory computer-readable medium 502 includes a set of computer-readable instructions to enable controlling power consumption of a computing device. The set of computer-readable instructions can be accessed by the processing resource 504 through the communication link 506 and subsequently executed to perform acts to enable controlling power consumption of the computing device.

Referring to FIG. 5, in an example, the non-transitory computer-readable medium 502 includes instructions 512 that cause the processing resource 504 to monitor charging current received by a computing device from a power adapter over a time period. The charging current may be, for example, the charging current 302, the computing device may be, for example, the computing device 102, and the power adapter may be, for example, the power adapter 202.

The non-transitory computer-readable medium 502 includes instructions 514 that cause the processing resource 504 to estimate a change in surface temperature of the power adapter over the time period based on the charging current received over the time period and length of the time period. In an example, the instructions 514 cause estimation of the change in surface temperature using an average of the charging current over the time period.

To estimate the change in surface temperature, the instructions 514 can cause the processing resource 504 to utilize a dependence model indicating dependence of the change in surface temperature on the average of the charging current and the length of the time period. The dependence model can be, for example, the dependence model 312.

The non-transitory computer-readable medium 502 includes instructions 516 that cause the processing resource 604 to control power consumption of the computing device based on the estimated change in surface temperature. For this, the instructions 516 can cause the processing resource 504 to control the power consumption of the computing device based on a comparison of the estimated change in the surface temperature with a threshold. For example, the instructions 516 can cause the power consumption of the computing device to decrease if an estimated increase in the surface temperature is beyond the threshold.

The present subject matter enables controlling power consumption of a computing device based on a change in surface temperature of its power adapter. Using techniques of the present subject matter, it can be ensured that an increase in surface temperature of the power adapter is controlled. Further, such a control is performed without the use of a temperature sensor to measure the surface temperature of the power adapter. Therefore, techniques of the present subject matter can be used with any power adapter, without adding a new component or any retrofitting. Thus, the present subject matter provides a simple, yet effective, technique for controlling change in the surface temperature of the power adapter.

Although implementations of controlling power consumption of computing devices have been described in language specific to structural features and/or methods, it is to be understood that the present subject matter is not necessarily limited to the specific features or methods described. Rather, the specific features and methods are disclosed and explained as example implementations.

We claim:

1. An apparatus comprising:
a computing device to receive a charging current from a power adapter, the computing device comprising a processor and memory coupled to the processor, the memory storing instructions that upon execution by the processor cause the processor to:
compute, by the processor, an average of the charging current received over a time period;
based on the average of the charging current and a length of the time period, determine, by the processor, if a change in surface temperature of the power adapter over the time period is beyond a threshold; and
control, by the processor, power consumption of the computing device based on the determination.

2. The apparatus of claim 1, wherein, to perform the determination, the processor is to utilize a dependence model indicating dependence of the change in surface temperature on the average of the charging current and the length of the time period.

3. The apparatus of claim 2, wherein, to perform the determination, the processor is to estimate the change in surface temperature using the dependence model.

4. The apparatus of claim 1, wherein, to control the power consumption based on the determination, the processor is to decrease the power consumption of the computing device if an increase in surface temperature is determined to be beyond the threshold.

5. The apparatus of claim 1, wherein, to decrease the power consumption, the processor is to throttle a processor of the computing device.

6. An apparatus comprising:

a power adapter; and a computing device comprising a processor and memory coupled to the processor, the memory storing instructions that upon execution by the processor cause the processor to:

monitor, by the processor, charging current received by the computing device from the power adapter;

determine, by the processor, if an increase in surface temperature of the power adapter over a time period is beyond a threshold based on a length of the time period and an average of the charging current over the time period; and decrease, by the processor, power consumption of the computing device if the increase in surface temperature is determined to be beyond the threshold.

7. The apparatus of claim 6, wherein, to determine if the increase in the surface temperature is beyond the threshold, the processor is to:

estimate the increase in the surface temperature based on the average of the charging current and the length of the time period; and compare the estimated increase in the surface temperature with the threshold.

8. The apparatus of claim 7, wherein the memory is to store a dependence model indicating dependence of the increase in surface temperature on the average of the charging current and the length of the time period, and wherein the processor is to utilize the dependence model to estimate the increase in the surface temperature.

9. The apparatus of claim 6, wherein the processor is to determine if an increase in surface temperature of the power adapter over a subsequent time period is beyond the threshold based on a length of the subsequent time period and an average of the charging current over the subsequent time period; and the processor is to increase power consumption of the computing device if the increase in surface temperature is determined to be less than the threshold.

10. The apparatus of claim 6, wherein the computing device comprises a processing resource and wherein, to decrease the power consumption, the processor is to throttle the processing resource.

11. A non-transitory computer-readable medium comprising instructions, the instructions being executable by a processing resource to:

monitor, by the processing resource, a charging current received by a computing device from a power adapter over a time period;

estimate, by the processing resource, a change in surface temperature of the power adapter over the time period based on the charging current received over the time period and length of the time period; and control, by the processing resource, power consumption of the computing device based on the estimated change in surface temperature.

12. The non-transitory computer-readable medium of claim 11, wherein, to estimate the change in surface temperature, the instructions are further executable by the processing resource to utilize an average of the charging current received over the time period.

13. The non-transitory computer-readable medium of claim 12, wherein, to estimate the change in surface temperature, the instructions are further executable by the processing resource to utilize a dependence model indicating dependence of the change in surface temperature on the average of the charging current and the length of the time period.

14. The non-transitory computer-readable medium of claim 11, wherein the instructions are executable by the processing resource to control the power consumption of the computing device based on a comparison of the estimated change in the surface temperature with a threshold.

15. The non-transitory computer-readable medium of claim 14, wherein, to control the power consumption, the instructions are further executable by the processing resource to decrease the power consumption of the computing device if an estimated increase in the surface temperature is beyond the threshold.

* * * * *